United States Patent [19]

Rodgers

[11] Patent Number: 4,836,467
[45] Date of Patent: Jun. 6, 1989

[54] CARWASH DRYER CONTROL SYSTEM

[75] Inventor: Lane Rodgers, Danville, Va.

[73] Assignee: Bivens Winchester Corporation, Danville, Va.

[21] Appl. No.: 242,522

[22] Filed: Sep. 12, 1988

[51] Int. Cl.$^4$ ............................................. B60S 3/06
[52] U.S. Cl. .................................... 15/316 R; 15/319; 34/243 C
[58] Field of Search ................ 15/319, 316 R, 316 A, 15/312 R, 405; 34/234 C

[56] References Cited

U.S. PATENT DOCUMENTS 3,877,107  4/1975  Cirino ............................ 15/316 R X Primary Examiner—Chris K. Moore
Attorney, Agent, or Firm—Krass & Young

[57] ABSTRACT

A carwash dryer station activated "on demand"; i.e., only when a vehicle requiring service approaches, and which is capable of being operated in a condition where the energy consumption level of the dryer blower is substantially lower than that of full, air-delivery operation. This is accomplished by use of a motor driven blower turbine having a continuous internal circulation path and an outlet which can be controlled by a valve independently of the motor to open only when a vehicle is present for service. Means are also provided for sensing the presence and location of a vehicle in a washer land and generating a corresponding output signal and for relaying the output signal to the air supply turbine.

6 Claims, 1 Drawing Sheet

U.S. Patent  Jun. 6, 1989  4,836,467
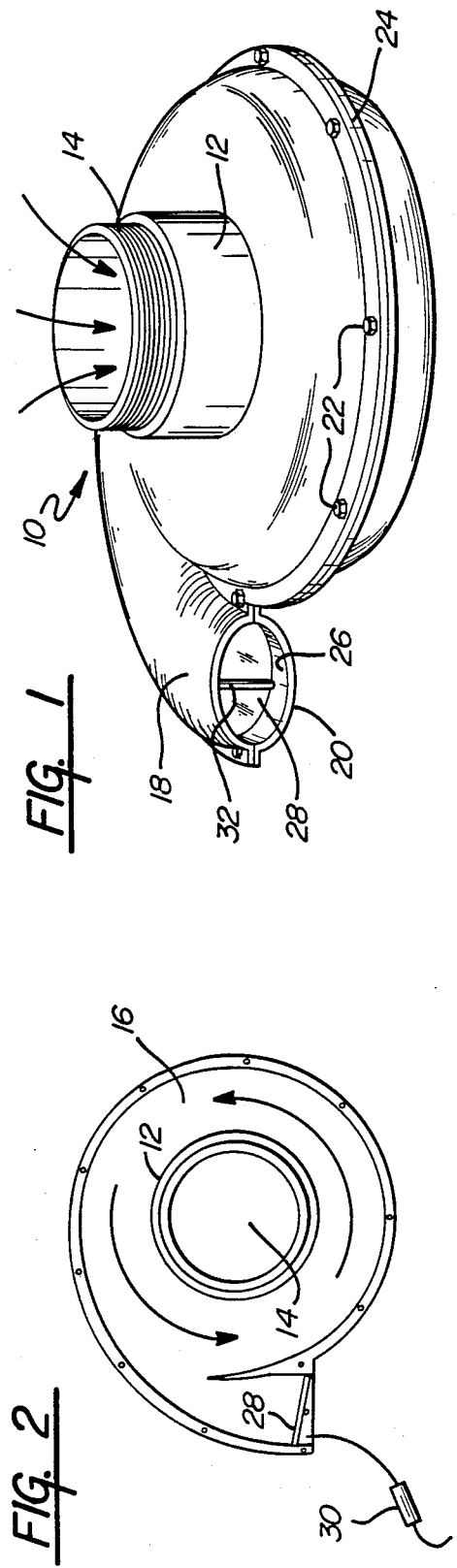
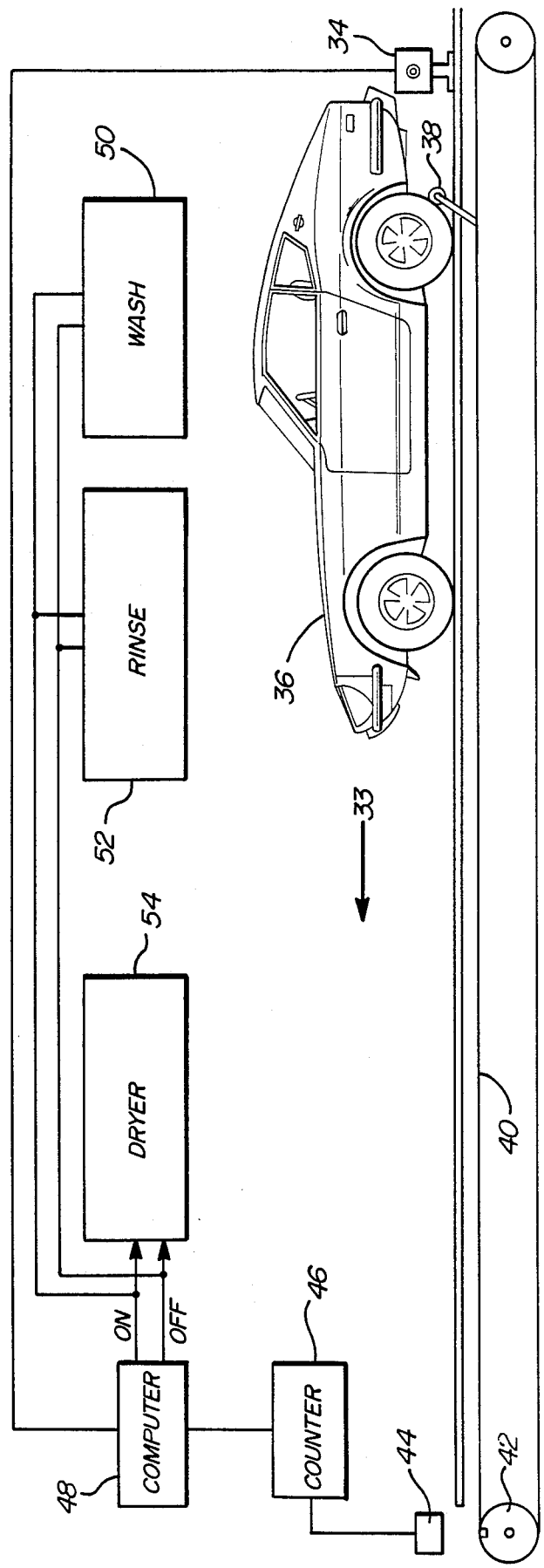

CARWASH DRYER CONTROL SYSTEM

FIELD OF THE INVENTION

This invention relates to apparatus for cleaning automotive vehicles and the like and more particularly to a forced-air vehicle drying system which is actuated only when there is a vehicle present in the wash lane.

BACKGROUND OF THE INVENTION

Retail vehicle washing services and the fabrication and sale of apparatus for performing vehicle washing and drying services have both become multi-million dollar businesses in the United States. One type of automatic car washer is the "tunnel washer" wherein a vehicle is rolled through a wash lane comprising a series of longitudinally spaced stations in which the vehicle is wetted, washed and rinsed. Many such car washers include a dryer at the terminal end where rinse water is removed by high velocity air, vehicle-contacting drying materials, and/or a combination of the two. For a more complete disclosure of an exemplary forced air dryer system, reference may be taken to copending application, "Vehicle Treatment Apparatus," Ser. No. 098,952, filed Sept. 2, 1987, and, assigned to the assignee of this application.

Frequently in this type of car washing apparatus, the machinery at the wetting, washing, rinsing and drying stations runs continuously even when no car is present in the wash lane, or it is started and stopped simultaneously for all stations when even a single customer-vehicle appears. These approaches are generally wasteful to energy, particularly the electricity which is consumed by high velocity blowers at the dryer station.

BRIEF DESCRIPTION OF THE INVENTION

The present invention provides a carwash dryer station which can be activated "on demand"; i.e. only when a vehicle requiring service approaches, and which is capable of being operated in a "ready-idle" condition in which the energy consumption level of the dryer blower is substantially lower than that of full, air-delivery operation. In general, this is accomplished by the use of a motor-driven dryer blower turbine having a continuous internal circulation path and an outlet which can be controlled by a valve independently of the motor to open only when a vehicle is present for service. Accordingly, the valve can be closed when a vehicle leaves to save electricity, yet not require restarting the motor when the next vehicle approaches.

In a preferred embodiment hereinafter described, the dryer control system comprises means for sensing the presence and location of a vehicle in the wash lane and generating a corresponding output signal and for relaying the output signal to the air supply turbine. This may include, for example, an electric eye, wand-actuated limit switch or other proximity detector to determine that a vehicle has entered the wash lane, and means, such as a counter associated with a vehicle conveyer, to determine when the vehicle has moved from the entrance to the dryer station. The same proximity detector may be used to measure the length of the vehicle thereby to determine how long the dryer actuation period must be.

BRIEF DESCRIPTION OF THE DRAWINGS

FIG. 1 is a perspective view of a dryer blower used in implementing the invention;

FIG. 2 is a schematic plan view of the blower of FIG. 1, and

FIG. 3 is a schematic depiction of one particular embodiment of a carwash dryer control system structured in accord with the principles of the present invention.

DETAILED DESCRIPTION OF THE INVENTION

Referring to the drawing, FIG. 1 is a plan view of a large air turbine 10 having a conventional internal impeller made of heavy gauge aluminum (not shown) driven by an electric motor 12 such as those produced by Westinghouse, Hauck or similar manufacturers. Electric motor 12 may vary in size from 15 hp to 40 hp depending upon application and turbine size. An air inlet means 14 sits atop the large air turbine 10 to allow the impeller to draw in outside air. An air inlet clearance of approximately 5 inches allows the impeller to perform most efficiently.

The impeller, driven by the electric motor 12, produces an air flow around a continuous, internal circulation path 16 formed, for example, by two mirror-image shells 18 and 20 and secured together by machine screws 22 or other suitable fasteners. A gasket 24 made of felt-like or other gasket material fits between the upper and lower shells 18 and 20 to prevent air leakage and reduce vibration. Shells 18 and 20 are preferably molded from glass-fiber reinforced organic resin.

An exit port 26 is opened and closed by a valve plate 28, under the control of a solenoid 30. The valve plate 28, made of brass, steel or other lightweight polymeric material is pivotally mounted in the exit port 26 by means of a pivoting rod 32 journaled in said exit port 26 through holes formed in said shells during the manufacturing process. Other conventional means may be employed to secure the pivoting rod 32 in the exit port 26. The valve plate 28 pivots between an open and closed position by means of the solenoid 30 which receives an output signal generated by the imminent presence of a vehicle near the drying service area. However, the valve plate 28 may be spring biased to the closed position and only opened when the solenoid 30 receives the output signal. A spring (not shown) encloses the pivoting rod 32 so that when no signal is received by the solenoid 30, the spring closes the valve plate 28. When the valve plate 28 is closed, the air produced by the turbine 10 recirculates around the continuous, internal path 16 as indicated by the arrows in FIG. 2.

FIG. 2 is a schematic depiction of the air turbine 10 of FIG. 1 with the valve plate 28 in the closed position. When the valve plate 28 is closed, the air produced by the turbine recirculates within the continuous, internal circulation path, putting the turbine into a "ready-idle" mode which will be discussed later. Solenoid 30 operates to open the valve plate 28 on receipt of an output signal generated by a source in the wash lane of an automatic car washer as shown in FIG. 3.

FIG. 3 is a schematic depiction of one embodiment of the present invention in a tunnel washer type of automatic car washer. FIG. 3 shows an electric eye 34 at the entrance of the wash lane 33 which detects the presence and measures the length of a vehicle 36 as it enters the wash lane 33. Wand-actuated limit switches or other proximity detectors such as photoelectric cells may also be used to detect the presence of a vehicle as it enters the wash lane. As shown in FIG. 3, the vehicle moves from the right to left through the wash lane 33 by means of a conveyer 40, here employing a wheel push roller 38 of conventional design. Conveyer chains, wherein an operator attaches a large hook to the front of a vehicle (now largely outdated) may also be used to pull the vehicle through the wash lane. Alternatively the vehicle driver can drive the vehicle through the wash lane under its own power.

In the embodiment of FIG. 3, a conveyer sprocket 42 is attached to the conveyer 40 so that as the conveyer 40 "tows" the car through the wash lane 33, the sprocket 42 rotates. As the conveyer sprocket 42 rotates, it emits a pulse-type signal which is received by sensor 44 and relayed to a pulse counter 46. Conventional pulse counter systems can be employed. The cumulative pulse count at any time, therefore, is an indication of the progress of the vehicle 36 through the wash lane 33. Again, wand-actuated limit switches or other proximity detectors periodically spaced through the wash lane and tripped by contacting the vehicle 36 as the vehicle moves through the wash lane 33 are other ways to indicate the progress of the vehicle 36 through the wash lane. Wand-actuated limit switches, however, require physical contact with the vehicle, possibly resulting in surface finish damage to the vehicle after repeated washing operations.

A computer 48 connects the pulse counter 46 or other proximity detector to the entrance of the wash lane, the wash 50, the rinse 52 and the dryer stations 54. The computer 48 is a microprocessor capable of simultaneously running a variet of programs such as turning the entire wash lane 33 on and off, monitoring the number of cars washed per unit of time, monitoring the amount of supplies such as soap, water and wax used in any particular day, controlling the speed of the conveyer 40, as well as regulating the control valves of the wash 50, rinse 52 and dryer 54 stations. Many brand names of microprocessors currently available are suitable for these functions. When a vehicle 36 in the wash lane 33 approaches the wash station 50, for example, the computer 48 sends a signal from the pulse counter 46 to the wash station 50 to activate the wash station 52. Likewise, when the vehicle's presence is imminent in the rinse station 52 or dryer service area 54, the computer 48 sends a signal to water control valves or to the solenoid to activate the respective systems as will be more fully developed later.

The wash lane of FIG. 3 also includes a wash station 50, a rinse station 52 and a dryer service area 54. The wash station 50 may be of any of a number of conventional wash means which wet, soap and scrub the vehicle 36. The wash station 50 can be a brush type, such as Slant System's Model 460 produced by Bivens Winchester Corporation of Danville, Va. wherein rotatable soft bristle brushes, turning at high revolutions per minute, contact all vehicle surfaces to remove dirt. The wash station 50 may also be of the cloth type wherein feltlike cloth strips are used to clean the vehicle, or may be a completely brushless, non-contacting washer system wherein high pressure combinations of water, soap and surfactants are sprayed onto the vehicle to remove the dirt.

The rinse station 52 typically is a galvanized metal arch 33 containing water spray nozzles which direct a high pressure stream of water onto the soaped and scrubbed vehicle. The rinse station 52 sprays high pressure water to remove soap and dirt from the vehicle. In some applications, the rinse station may also contain a liquid wax application wherein liquid wax is sprayed at high pressure onto a washed and rinsed vehicle.

After leaving the rise station 52 the vehicle 36 progresses to the dryer service area 54. In the dryer service area 54, high velocity forced air is used to dry the rinsed vehicle. High velocity forced air can blow onto the vehicle 36 in any of a number of ways. For example, Slant Systems Water Bandit and Model 466 Conveyer Dryer, both produced by Bivens Winchester Corporation, forces air, produced by a large air turbine, through soft, conical nozzles attached to a plenum to remove water as is more fully explained in copending application, Vehicle Treatment Apparatus, Ser. No. 098,952, filed Sept. 2, 1987 and incorporated by reference to this application. Vehicle contacting material such as long, soft, feltlike cloth strips may also be used in combination with forced air to dry a vehicle as the vehicle contacts them by moving through the wash lane. The wheel push roller 38 on conveyer 40 pushes the dried vehicle 36 out of the wash lane and the vehicle operator resumes control of his vehicle.

INDUSTRIAL APPLICABILITY

A typical operational sequence is as follows: The active components of the stations 50, 52 and 54 are powered up to the "ready-idle" state. In this state, motor 12 is activated but valve plate 28 is closed to cause air in turbine 10 to recirculate internally. Vehicle 36 is positioned where it may be picked up by push roller 38. As vehicle 36 is towed forward, it breaks the beam to electric eye 34. The beam remains broken until the vehicle 36 is towed completely past the eye 34.

The initial beam interruption sets computer 48 to a ready state. During the passage of the vehicle, pulses are counted in proportion to the length of the vehicle and stored in a length register. Another preset register containing a count representing the distance from eye 34 to dryer station 54 is counted down to zero. When this second register reaches zero, the valve plate 28 is opened to allow high velocity air to reach the vehicle. When the second register reaches zero, the counter 46 is connected to the length register to count it back to zero. The length register reaches zero when the entire vehicle has passed station 54 and the computer operates solenoid 30 to close valve plate 28.

Summarizing, when the valve plate 28 is closed or partially closed, the turbine is in a "ready-idle mode", meaning that electric motor 12 drives the turbine 10 producing air which recirculates along the continuous, internal path but not through the exit port 26. When the presence of a vehicle is imminent to the drying service area, solenoid 30 receives the "demand" signal generated by the electric eye 34 and the solenoid 30 opens the valve plate 28 from the ready-idle mode to supply air to dry the vehicle. Opening the valve plate 28 allows the air produced by the turbine 10 to exit through the exit port 26 to dry the vehicle, taking the turbine out of the ready-idle mode.

When the vehicle leaves the dryer service area, the valve plate 28 closes and puts the turbine back into the ready-idle mode again, until the next vehicle appears. By going into the ready-idle mode, the turbine 10 is not continuously blowing air through the exit port 26 to dry vehicles which are not present, resulting in a large savings in electrical consumption. The ready-idle mode also avoids a total power shut-down which requires a start-up period at the beginning of each new dryer cycle when no cars are present in the wash lane, resulting in even greater energy savings. By idling between vehicle dryer cycles and restricting the air volume through the exit port 26, the turbine utilizes less than 50% of normal operating power. For example, the "Water Bandit Drive Through Dryer" made by Slant Systems, Model 336 employs a 30 Hp turbine requiring 100 amps of power to operate. When the valve plate 28 closes, the turbine goes into the ready-idle mode and only requires approximately 40 amps of power to operate. The valve plate 28 also restricts the amount of air output during the start-up of the turbine after the turbine has been shut down, such as at closing or during extended period of inclement weather. By restricting the amount of air output during start-up, the number of amps required to start the motor are also reduced, resulting in a large savings in electrical consumption.

A timer may be included on the computer 48 so that when no vehicles are present in the wash lane for an extended period of time, such as during inclement weather or slow customer periods, the timer or timing program of the computer operates to shut the entire washer system down. This results in a large savings in electrical as well as water consumption.

Many variations are possible within the scope of the present invention. For example, the principles of the present invention may be embodied into a free-standing car wash dryer apparatus found in other types of car washing equipment commonly known to those familiar in the art as rollover and drive through washers, such as that produced by Slant Systems known as the "460 D Wash 'n Dri" rollover washer. Also it is not necessary for the valve plate to close the exit port entirely; only a partial blockage of the exit port regulating the air volume output produced by the turbine is necessary to be in accord with the principles of the present invention. Accordingly the foregoing drawings, discussion and description are merely meant to be illustrative of particular embodiments of the invention at no limitations upon the practice thereof. It is the following claims, including all equivalents, which define the scope of the invention.

I claim:

1. For use in a vehicle washer system having a wash lane;

an air blower having a continuous internal circulation path and an outlet from said path;

an electric motor driving said blower;

valve means disposed in said outlet for opening and closing same;

means for actuating said valve means independently of said motor to open said outlet and obtain air from said blower on demand only; and means for directing air from said outlet to the surface of a vehicle.

2. Apparatus as defined in claim 1, wherein said means for actuating said valve means comprises means for determining the imminent presence of a vehicle in said service area.

3. Apparatus as defined in claim 1, wherein said means for actuating said valve means further includes means for generating an output signal corresponding to a location of said vehicle in said wash lane.

4. Apparatus as defined in claim 3, wherein said means for generating an output signal includes means for determining the location of the vehicle in said wash lane.

5. Apparatus as defined in claim 1, wherein said means for actuating said valve means further includes means for relaying an output signal.

6. Apparatus as defined in claim 1, wherein said valve means is pivotally mounted in said outlet so that pivoting said valve means from a first position to a second position allows the flow of air from said blower through said outlet, and pivoting said valve means back to said first position ceases the flow of air through said outlet, said air flow recirculating within said continuous internal circulation path.

* * * * *